(12) United States Patent  
Keddie (10) Patent No.: US 11,276,031 B2
(45) Date of Patent: Mar. 15, 2022

(54) ULTRAVIOLET (UV) FLUORESCING PRODUCT CODES

(71) Applicant: Dover Europe Sarl, Vernier (CH)

(72) Inventor: Steven D. Keddie, Marietta, GA (US)

(73) Assignee: Dover Europe Sarl, Vernier (CH)

( * ) Notice: Subject to any disclaimer, the term of this patent is extended or adjusted under 35 U.S.C. 154(b) by 712 days.

(21) Appl. No.: 15/839,701

(22) Filed: Dec. 12, 2017

(65) Prior Publication Data

US 2019/0180222 A1 Jun. 13, 2019

(51) Int. Cl.
| | |
|---|---|
| G06Q 10/08 | (2012.01) |
| G06K 19/077 | (2006.01) |
| H04L 9/32 | (2006.01) |
| G06Q 20/20 | (2012.01) |
| G05B 19/042 | (2006.01) |
| G05B 19/12 | (2006.01) |

(52) U.S. Cl.
CPC ......... *G06Q 10/087* (2013.01); *G05B 19/042* (2013.01); *G05B 19/124* (2013.01); *G06K 19/07758* (2013.01); *G06Q 20/208* (2013.01); *H04L 9/3226* (2013.01)

(58) Field of Classification Search
CPC .............. G06Q 10/087; G06Q 20/208; G06K 19/07758; H04L 9/3226
See application file for complete search history.

(56) References Cited

U.S. PATENT DOCUMENTS

| | | | | |
|---|---|---|---|---|
| 5,621,449 | A * | 4/1997 | Leenders | ............. B41M 5/0011 106/31.19 |
| 6,069,955 | A | 5/2000 | Coppersmith et al. | |
| 6,226,619 | B1 | 5/2001 | Halperin et al. | |
| 7,191,019 | B2 | 3/2007 | Verstraeten | |
| 7,322,520 | B2 | 1/2008 | Warden et al. | |
| 7,460,921 | B2 | 12/2008 | Sullivan et al. | |
| 7,577,596 | B2 | 8/2009 | Antonuk et al. | |
| 8,922,611 | B1 | 12/2014 | Benton | |
| 2002/0195586 | A1 | 12/2002 | Auslander et al. | |
| 2003/0041774 | A1* | 3/2003 | Auslander | .............. C09D 11/50 106/31.32 |
| 2004/0099736 | A1 | 5/2004 | Neumark | |
| 2004/0100380 | A1 | 5/2004 | Lindsay et al. | |

(Continued)

OTHER PUBLICATIONS

"Intensity." Dictionary.com. Dictionary.com, 2020.Web. Jan. 14, 2020. (Year: 2020).*

(Continued)

*Primary Examiner* — Fahd A Obeid
*Assistant Examiner* — Michael Jared Walker
(74) *Attorney, Agent, or Firm* — Fish & Richardson P.C.

(57) ABSTRACT

Systems and methods for printing and verifying product codes using ultraviolet (UV) fluorescing ink include, in at least one aspect, a system including: a UV light source configured and arranged to illuminate, with UV light, product codes printed on products; a camera configured and arranged to capture visible light emitted by a single ink of the product codes responsive to the illumination with the UV light, where the single ink includes a combination of a non-fluorescing substance and a UV fluorescing substance; and a controller coupled with the camera and configured to perform machine vision processing on the captured visible light to identify and confirm the product codes printed on the products.

18 Claims, 3 Drawing Sheets

(56) References Cited

U.S. PATENT DOCUMENTS

| | | | |
|---|---|---|---|
| 2005/0234778 A1 | 10/2005 | Sperduti et al. | |
| 2008/0252066 A1* | 10/2008 | Rapoport | B41M 1/14 |
| | | | 283/94 |
| 2014/0119665 A1* | 5/2014 | Stokes | G06K 9/2063 |
| | | | 382/201 |
| 2017/0302840 A1* | 10/2017 | Hasinoff | H04N 1/2137 |
| 2017/0330137 A1* | 11/2017 | Wade | G06K 7/12 |

OTHER PUBLICATIONS

European Application No. 18210209.5, Extended European Search Report dated May 10, 2019, 9 pages.
Greengard, Samuel, "RFID: Cure for Counterfeit Drugs," RFID Journal, Oct. 15, 2003.
Juels, Ari, "Strengthening EPC Tags Against Cloning," Proc. 2005 ACM Workshop on Wireless Security, Cologne, Germany, Sep. 2, 2005.
Mohan, Anne Marie, "RFID key to FDA's anti-counterfeit strategy," Packaging Digest, Jun. 2004, p. 54.
Weekly, David E., "Steganographic Encoding of Information Using a Non-Deterministic Finite State Automaton," Unknown publication, date of publication believed to be on or around Sep. 13, 2002.
Won Tesoriero, Healther, "Radio ID Tags Will Help Monitor Drug Supplies," The Wall Street Journal Online, Nov. 16, 2004, p. D9.
InData Systems, "A whitepaper on: Invisible and Fluorescing Bar Code Printing and Reading", Version 1.03, www.uvreaders.com, Industrial Data Entry Automations Systems Incorporaed, Skaneateles, NY, Feb. 11, 2011, pp. 1-12.
European Application No. 18210209.5, Communication pursuant to Article 94(3) EPC, dated Apr. 30, 2021, 11 pages.

* cited by examiner

ULTRAVIOLET (UV) FLUORESCING
PRODUCT CODES

BACKGROUND

This specification relates to industrial printing systems, and in particular, systems and techniques relating to printing product codes on the packaging of products in a manufacturing or distribution facility.

Various industrial printing technologies are known and enable the printing of important information (e.g., sell by dates) on packaging. As this information can be critical, product manufacturers now wish to verify the codes have been printed correctly. Machine vision systems are routinely used for this purpose. In order for these codes to be read successfully and quickly, the print should have a high contrast relative to the surrounding packaging. Some manufacturers use white date code boxes and black codes to provide the high contrast codes since the code printed in black is readily identifiable by machine vision systems against the white background of the medium on which the code is printed.

SUMMARY

This specification describes technologies relating to industrial printing systems, and in particular, systems and techniques relating to printing and verifying product codes using ultraviolet (UV) fluorescing ink.

In general, one or more aspects of the subject matter described in this specification can be embodied in one or more systems that include: a product line configured to move products through a facility; a printer arranged in proximity to at least a portion of the product line, the printer configured to mark the products moved through the facility on the product line with product codes using a single ink including a combination of a non-fluorescing substance and a UV fluorescing substance (or using an ink printed over substrate material of the products that includes the UV fluorescing substance); a UV light source configured and arranged to illuminate the product codes printed on the products with UV light; a camera configured and arranged to capture visible light emitted by the single ink of the product codes (or by the UV fluorescing substance of the substrate material under the printed ink) responsive to the illumination with the UV light; and a controller coupled with the camera and configured to perform machine vision processing on the captured visible light to identify and confirm the product codes printed on the products.

These and other embodiments can optionally include one or more of the following features. A ratio and a concentration of the non-fluorescing substance and the UV fluorescing substance in the single ink can be selected to balance readability by humans under ambient visible lighting conditions and readability by the machine vision processing under the UV illumination. The ratio and the concentration of the non-fluorescing substance and the UV fluorescing substance in the single ink can be selected to generate sufficient visible light responsive to the UV illumination for the machine vision processing after capture by the camera with an exposure time of 150 millisecond or less, 120 millisecond or less, or 100 millisecond or less. Further, the non-fluorescing substance can include components of a black ink, and the single ink can be black or dark grey under ambient visible lighting conditions.

The UV fluorescing substance can be selected to fluoresce at a specified visible light wavelength, and the system can include a wavelength pass filter located between the camera and the product codes, wherein the wavelength pass filter (i) allows light at the specified visible light wavelength to pass through and (ii) blocks light of at least one other visible light wavelength. The specified visible light wavelength can be approximately 510 nanometers or approximately 450 nanometers. The UV light source can emit light having a wavelength of 365 nanometers. The product codes can include date codes. The printer can include thermal transfer (TT) printer technology, drop on demand (DOD) printer technology, thermal inkjet (TIJ) printer technology, or continuous ink jet (CIJ) printer technology. Furthermore, the facility can be a product manufacturing facility, and the product line can be a product packaging system.

In addition, one or more aspects of the subject matter described in this specification can be embodied in one or more methods that include: moving products on a product line; printing product codes on the products on the product line using a single ink comprising a combination of a non-fluorescing substance and an ultraviolet (UV) fluorescing substance (or using an ink printed over substrate material of the products that includes the UV fluorescing substance); illuminating the product codes printed on the products with UV light; capturing visible light emitted by the single ink of the product codes (or by the UV fluorescing substance of the substrate material under the printed ink) responsive to the UV light illumination of the product codes; and performing machine vision processing on the captured visible light to identify and confirm the product codes printed on the products.

These and other embodiments can optionally include one or more of the following features. Printing the product codes can include using the single ink, which has a ratio and a concentration of the non-fluorescing substance and the UV fluorescing substance that has been selected to balance readability by humans under ambient visible lighting conditions and readability by the machine vision processing under the UV illumination. Capturing the visible light can include using a camera with an exposure time of 150 millisecond or less, 120 millisecond or less, or 100 millisecond or less, and the ratio and the concentration of the non-fluorescing substance and the UV fluorescing substance in the single ink can be selected to generate sufficient visible light responsive to the illuminating for the machine vision processing after capture by the camera with the exposure time.

Illuminating can include causing the UV fluorescing substance to fluoresce at a specified visible light wavelength corresponding to a wavelength pass filter that (i) allows light at the specified visible light wavelength to pass through and (ii) blocks light of at least one other visible light wavelength. The illuminating can include emitting light having a wavelength of 365 nanometers. Printing the product codes can include printing date codes. Printing the product codes can include using a thermal transfer (TT) printer. Printing the product codes can include using a drop on demand (DOD) printer. Printing the product codes can include using a thermal inkjet (TIJ) printer. Printing the product codes can include using a continuous ink jet (CIJ) printer.

Various embodiments of the subject matter described in this specification can be implemented to realize one or more of the following advantages. Product codes can be printed on various products using traditional industrial printing technologies, but the ink delivery system can be designed to cause the traditional industrial printing technologies to print high contrast codes by means of UV fluorescing ink, which can be accurately and quickly read using machine vision systems. Product manufacturers can use the systems and techniques described herein to print on the patterned side of product packaging and still achieve the high contrast necessary for the machine vision systems to operate successfully. This allows the printing of product codes over colorful backgrounds on product packaging, where the colorful backgrounds can be changed (e.g., from promotion to promotion and/or from product to product) without having to change the product codes' printing process since the combination ink (e.g., a combination of black and UV ink components) will still be readable by machine vision systems when the background color changes.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
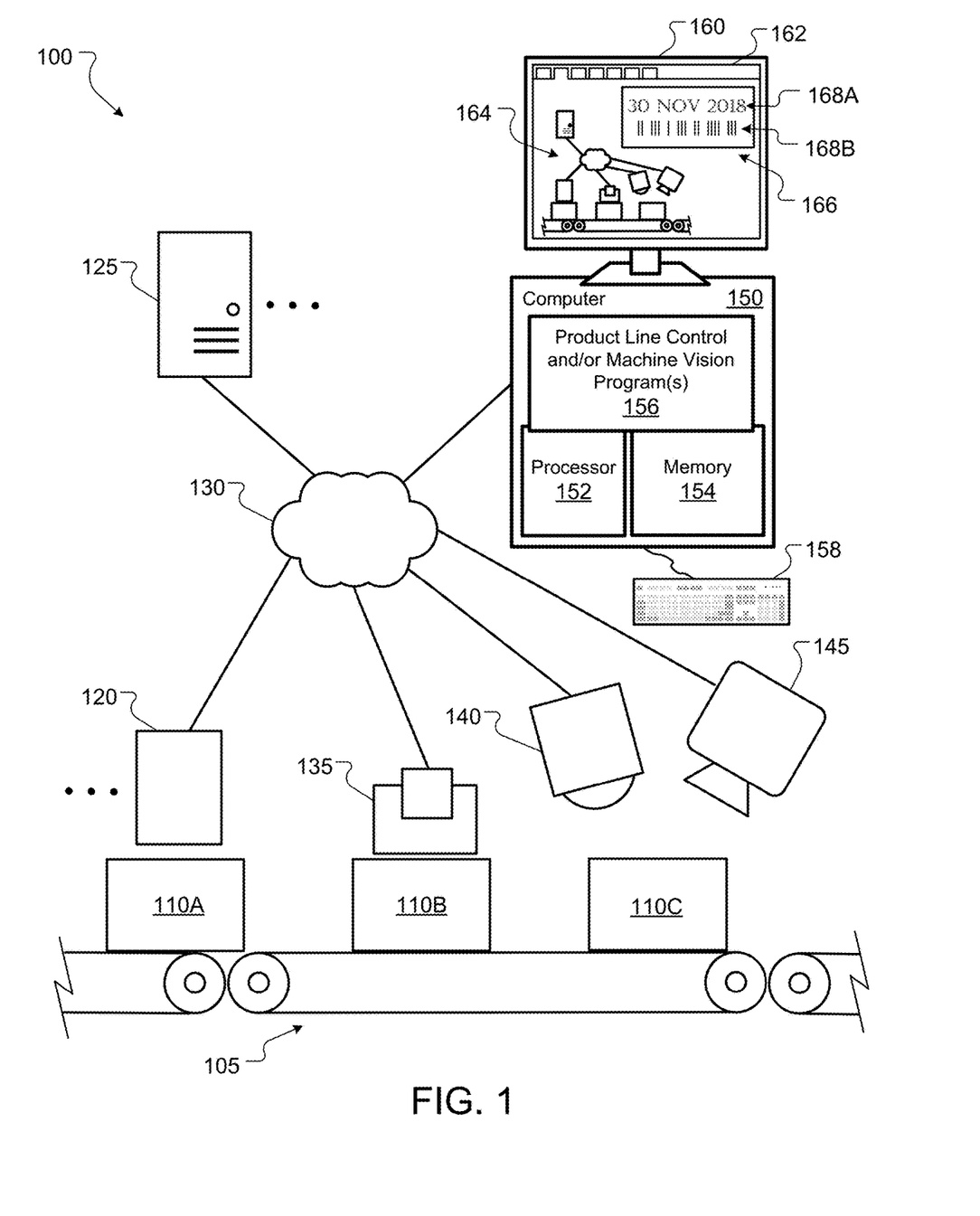
FIG. 1 shows an example of a system usable to print and verify ultraviolet (UV) fluorescing product codes.

Product codes (e.g., date codes) are provided, where the product codes appear as normal codes (e.g., codes printed in black ink) on packaging in normal light (e.g., daylight) but fluoresce under ultraviolet (UV) illumination, thereby providing a high contrast code that can be accurately and quickly read using machine vision systems. FIG. 1 shows an example of a system 100 usable to print and verify UV fluorescing product codes. The system 100 includes a product line configured to move products 110A, 110B, 110C through a facility, which can include one or more conveyor belts 105. The facility can be a product manufacturing facility, a product distribution facility, and/or other industrial/business facilities/buildings, and the product line can include a product packaging system, a product sorting system, and/or other product handling/management systems.

In some implementations, the system 100 includes one or more product interaction units 120 that are communicatively coupled with one or more control computers 125 through a network 130. The product interaction units 120 can include various systems and devices, such as printers or RFID (radio frequency identification) stations for encoding information on the product 110A, scales to weight the product 110A, various mechanical actuators to move the product in particular ways, etc. The network 130 can be a private network, a public network, a virtual private network, etc., and the network 130 can include wired and/or wireless networks. For additional details regarding systems and techniques for product line configuration, see U.S. Pat. No. 7,191,019, issued on 13 Mar. 2007, and entitled, "Dynamic line configuration", which is hereby incorporated by reference.

The system 100 includes at least one printer 135 that is configured and arranged in proximity to the product line to mark the products 110 (e.g., product 110B) with product codes, as desired by a system operator. Note that the "products" 110 can be individual consumer units, boxes of units for delivery (dispatch units), and/or whole pallets of units or boxes, as well as the packaging or labelling for any of the foregoing. Thus, in some implementations, the printer 135 includes both a printing device (which prints on labels) and a label applicator (which applies the labels to the product packaging). In any case, the printer 135 effects the marking of products 110 with product codes (either directly or indirectly) and is proximate to the product line in that it is close enough to print the product codes directly on a merchandise unit, packaging for a merchandise unit, or a label for a merchandise unit.

The printer 135 can employ various types of printer technologies. For example, in some implementations, the printer 135 employs thermal transfer (TT) printer technology. In various other implementations, the printer 135 employs drop on demand (DOD) printer technology, thermal inkjet (TIJ) printer technology, or continuous ink jet (CIJ) printer technology. Those skilled in the art will understand the details of those printer technologies and how to use them. In any case, the printer 135 marks the products 110 using a single ink that is a combination of a non-fluorescing substance and a UV fluorescing substance.

Figure 2A:
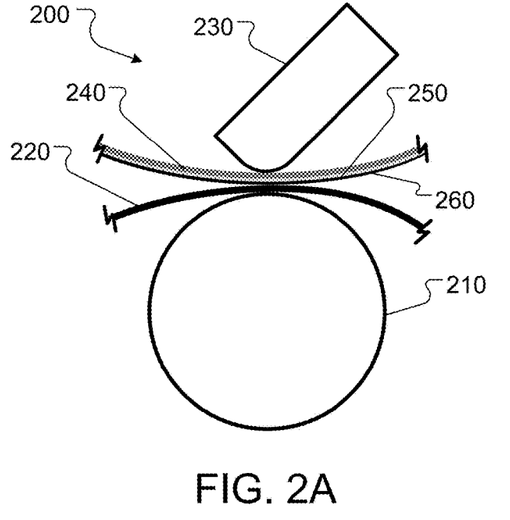
FIGS. 2A-2C show examples of thermal transfer printing of UV fluorescing product codes.

FIG. 2A shows an example of thermal transfer (TT) printing 200 of UV fluorescing product codes. The TT printing 200 employs various known system components, such as a substrate carrier 210 (e.g., a roller or platen) to hold and transport a printing substrate 220 in proximity to a TT print head 230. As will be appreciated, other system components or different system configurations can be used. For example, rather than the TT print head 230 (or other printer technology) printing on a substrate 220 that is applied later to a product, the TT print head 230 (or other printer technology) can print directly on a product, as described above.

In the example of FIG. 2A, the ink is delivered on a ribbon or band 240 (e.g., a polyimide film or a metal-based material) on which both a UV fluorescing component 250 and a visible (e.g., black) component 260 are combined to form the single ink for printing. In some implementations, the ribbon or band 240 is a ribbon 240 stored on a spool (not shown) for use in a reel-to-reel printer. In other implementations, the ribbon or band 240 is a continuous band 240 of material that is driven by a printer around guide rollers from a re-inking station to a printing station and back (see e.g., U.S. Pat. No. 8,922,611, issued 30 Dec. 2014, and entitled, "Apparatus and method for thermal transfer printing", which is hereby incorporated by reference).

Figure 2B:
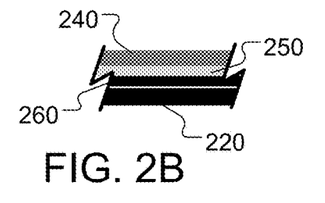

FIG. 2B shows a close up view of the ribbon or band 240, with both the UV fluorescing component 250 and the visible (e.g., black) component 260 of the ink. These components 250, 260 are shown as separate items in FIG. 2B for ease of understanding, but as will be appreciated, the two components 250, 260 are combined together to form the single ink on the ribbon or band 240. In addition, other configurations of the ink delivery are also possible, while still achieving high-contrast product codes.

Figure 2C:
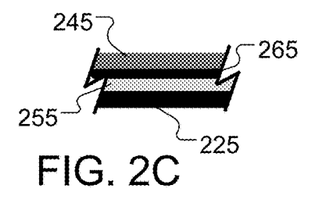

For example, FIG. 2C shows another approach to using UV fluorescence to provide high-contrast products codes in a printer system. A ribbon or band 245 carries a visible ink 265 (e.g., black ink), and a UV component 255 is provided with a substrate 225. As before, the UV component 255 is shown as being separate from the substrate 225, but as will be appreciated, the UV component 255 can be partially or completely combined with the substrate 225 (e.g., the UV component 255 can be absorbed into the surface of the substrate 225). This can be understood as the inverse of the other approach since the substrate has the UV property, and the applied ink covers the UV fluorescence of the substrate. Thus, when illuminated by UV light, a negative image is observed by the camera. This approach may increase the cost of the substrate, but this can still be useful for many applications, such as when a company wants to enhance the shelf appearance of their products by having UV dye incorporated into the product packaging.

In any case, note that the ink delivery mechanism is preferably designed to work with existing printer technologies, e.g., traditional TT, DOD, TIJ and CIJ printer technologies. For example, the design specification can include various details concerning the ink delivery mechanism in relation to the printer technology, such as the linear speed and pack rage (pitch of print) of the TT printer (e.g., 120 packs per minute (ppm) run at 180-225 mm/s, 100-120 ppm at 300 mm/s, or 50-60 ppm at 150-350 mm/s), adhesion/rub resistance, packaging material (e.g., Oriented Polyproylene (OPP), Biaxially-Oriented Polyproylene (BOPP), or Polyethylene Terphthalate (PET)). In addition, minor changes may be made to the printer while still being usable with existing printer technologies. For example, some firmware updates may be made to the printer, such as changes related to ribbon selection options and a flexible input/output (I/O) encoder distance trigger for the camera that will take pictures of the product codes under UV light.

Referring again to FIG. 1, the system 100 also includes a UV light source 140 and a camera 145. The UV light source 140 can be a fluorescent tube UV light source or another type of UV light source, and the UV light source 140 can employ various technologies to generate and emit UV light, e.g., a Light Emitting Diode (LED) based light source. The UV light source 140 is positioned relative to the product line to illuminate the product codes printed on the products 110, e.g., product 110C is currently illuminated with UV light in FIG. 1.

The camera 145 is coupled with a control computer 125, such as a computer 150. The computer 150 includes a processor 152 and a memory 154, and the computer 150 can be coupled with the camera 145 either directly or through the network 130 (as shown). The processor 152 can be one or more hardware processors, which can each include multiple processor cores. The memory 154 can include both volatile and non-volatile memory, such as Random Access Memory (RAM) and Flash RAM. The computer 150 can include various types of computer storage media and devices, which can include the memory 154, to store instructions of programs that run on the processor 152.

Such programs include a machine vision program 156. Various machine vision programs 156 can be used in various implementations, and the machine vision processing components can be integrated with (or provided along with) the camera 145. For example, the camera 145 and machine vision program 156 can be provided by Cognex Corporation, of Natick, Mass., e.g., the Cognex 78XX series, the Cognex 74XX series, or other machine vision systems or barcode readers. The machine vision program 156 processes the captured images to identify and interpret the product codes, and compare them against what is expected to be found on the products 110. When a captured product code doesn't match the product code that should have been printed on the product, appropriate actions can be taken, such as alerting a user or triggering a redirection of the unverified product out of the product line for further analysis and/or disposal.

In some implementations, the program 156 presents a user interface (UI) 162 on a display device 160 of the computer 150, which can be operated using one or more input devices 158 of the computer 150 (e.g., keyboard and mouse). Note that while shown as separate devices in FIG. 1, the display device 160 and/or input devices 158 can also be integrated with each other and/or with the computer 150, such as in a tablet computer, where the one or more input devices 158 can be part of a touch screen display 160.

In some implementations, the program(s) 156 also include a product line control program 156. Thus, the product codes verification system can be integrated with the product line configuration and management system as shown in the example of FIG. 1, and the program(s) 156 can present a graphical representation 164 of the product line in combination with control functions made available to the user of the system. In addition, the program(s) 156 can present a graphical representation 166 in the UI 162 showing the product codes captured by the camera 145.

In the example shown, each product code includes both a sell-by-date 168A and a barcode 168B (note that the examples used in FIG. 1, e.g., "30 Nov. 2018" for sell-by-date 168A, are arbitrary in that the information included in the product codes will depend on the particular product and the time and/or location of its manufacture/distribution). Other codes are also possible, such as a two dimensional bar code, e.g., a QR (quick response) code. To make the product codes easier to identify by the camera 145, the contrast for the product codes is increased by the use of UV fluorescing component(s) in the ink, where those component(s) correspond to the UV light source 140. In some implementations, the UV light source 140 emits light having a wavelength of 365 nanometers. Other UV wavelengths can also be used, such as a wavelength of 395 nanometers. In some implementations, the ink is designed to fluoresce when illuminated by one of these two UV wavelengths: 365 nm or 395 nm. Moreover, in some implementations, the UV light source 140 can emit UV light in a range of wavelengths, even when a particular wavelength is being targeted as the primary wavelength for activating the UV component(s) of the ink.

At the verification point, the camera 145 captures visible light emitted by the single ink of the product codes responsive to the illumination with the UV light source 140. As will be appreciated, the wavelength of the UV light should be chosen to cause as much fluorescence of the ink being used, as possible, or equivalently, given a particular UV light source 140, the components of the ink should be chosen to cause as much fluorescence of the ink being used, as possible. This facilitates the controller (e.g., computer 150 with machine vision program 156) to perform machine vision processing on the captured visible light to identify and confirm the product codes printed on the products since the contrast ratio for the product codes as compared with the background of the product is increased substantially by the fluorescing of the ink responsive to the UV light.

However, the ink of the product codes also needs to be visible to the human eye, which means the printed codes need to be dark enough under regular visible lighting conditions to be discernable by a person. Thus, a ratio and a concentration of the non-fluorescing substance and the UV fluorescing substance in the single ink can be selected to balance readability by humans under ambient visible lighting conditions and readability by the machine vision processing under the UV illumination. Various dyes and/or pigments can be used when achieving this balance. For example, one or more UV dyes can be used (e.g., one or more dyes that emit blue light under UV illumination) or one or more UV pigments can be used (i.e., one or more pigments that emit green light under UV illumination). In any case, balancing of the visible and UV pigments and/or dyes in the single ink can be readily accomplished once target printer and machine vision processing technologies are determined.

In addition, the speed of the product line and the shutter speed of the camera 145 should be taken into consideration when selecting a UV light source 140 and designing the ink used to print the product codes. In general, the UV fluorescing substance(s) added to the single ink should cause the ink to fluoresce with sufficient brilliance to be effectively captured by the camera 145 given its shutter speed. For example, in various implementations, the ratio and the concentration of the non-fluorescing substance and the UV fluorescing substance in the single ink are selected to generate sufficient visible light responsive to the UV illumination for the machine vision processing after capture by the camera 145 with an exposure time of 150 millisecond or less, 120 millisecond or less, or 100 millisecond or less. However, in some cases, there will be tradeoffs between the loss of ink adhesion and darkness when the UV pigments and/or dyes are increased, and so minimum exposure time and vision system robustness can be limiting factors for throughput of the system.

While the visible component(s) of the single ink need not be black, this will typically be the case since black product codes are more readily readable by humans against a non-black background color. Thus, the non-fluorescing substance in the single ink can be components of a black ink (often referred to as "carbon black"), and the single ink will thus be black or dark grey under ambient visible lighting conditions. In some cases, the UV pigments and/or dies will be effectively enveloped by die based ink(s) that provide the base color under visible light illumination, and so the UV fluorescing substance(s) in the single ink will not change the color of the ink under normal lighting conditions.

In addition, as noted above, the verification point for the product codes need not be included in a product manufacturing facility. In some implementations, the verification point is placed in a product distribution facility or in other locations in a supply chain, including potentially at the point of sale. Thus, various components of the system 100, including the printer 135, need not be included in all implementations.

Figure 3:
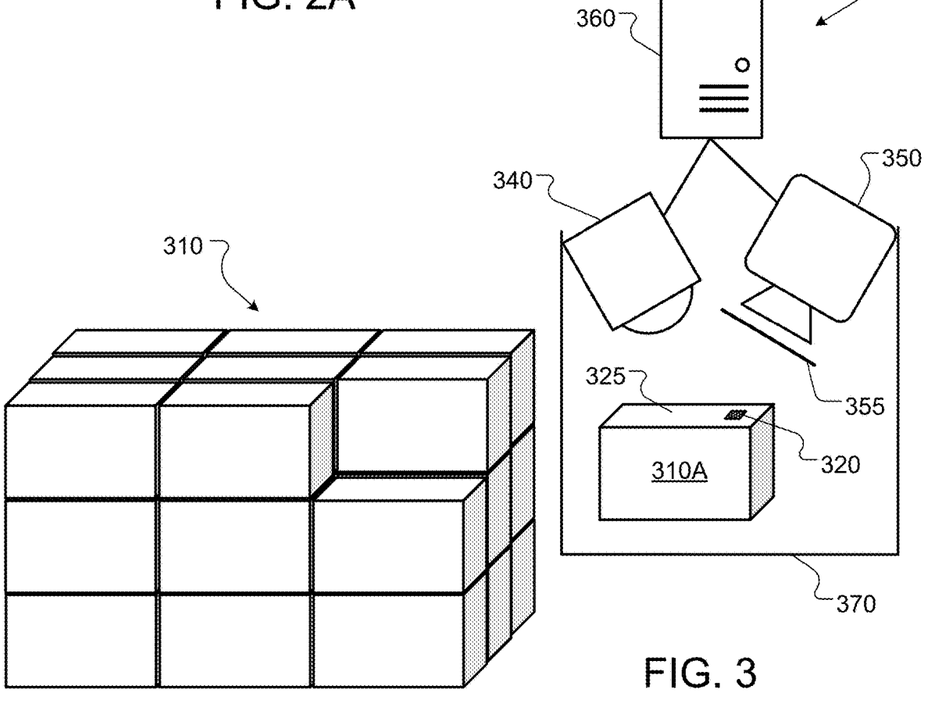
FIG. 3 shows an example of a system usable to verify UV fluorescing product codes.

FIG. 3 shows an example of a system 300 usable to verify UV fluorescing product codes. In this example, a pallet 310 of boxes is being verified, where each box includes a product code on its outside and contains inside the individual consumer units. Note that the pallet 310 itself and/or the individual consumer units inside the boxes can also have their own product codes. In the example shown, a first box 310A has been taken off the pallet 310 and placed at the verification point.

The box 310A includes a QR code 320 on an exterior surface material 325 of the box 310A. A UV light source 340 illuminates the QR code 320 with UV light to cause the UV fluorescing substance(s) in the ink forming the QR code 320 to fluoresce at a specified visible light wavelength. The visible light wavelength is specified at the time of system/ink design.

In some implementations, the specified visible light wavelength (resulting from fluorescing under UV illumination) is approximately 510 nanometers, e.g., green light in the range of 490-530 nanometers, green light in the range of 495-525 nanometers, green light in the range of 500-520 nanometers, or green light in the range of 505-515 nanometers. Note that the use of "approximately" indicates that not all the light need be entirely within the specified range around the target wavelength, but rather that a standard deviation of the light wavelengths created by the fluorescing substance(s) in the single ink falls within the range of wavelengths around the target. In the green portion of the visible spectrum, the target wavelength need not be 510 nanometers, but in some cases can be 495 nm (e.g., with a range of 490-500 nm), 500 nm (e.g., with a range of 495-505 nm), 505 nm (e.g., with a range of 500-510 nm), 515 nm (e.g., with a range of 510-520 nm), 520 nm (e.g., with a range of 515-525 nm), or 525 nm (e.g., with a range of 520-530 nm).

In addition, the specified visible light wavelength (resulting from fluorescing under UV illumination) can be blue light. For example, the specified visible light wavelength can be approximately 450 nanometers, e.g., blue light in the range of 420-480 nanometers, blue light in the range of 425-475 nanometers, blue light in the range of 430-470 nanometers, blue light in the range of 435-465 nanometers, blue light in the range of 440-460 nanometers, or blue light in the range of 445-455 nanometers. The use of "approximately" indicates the same flexibility in the full spectrum of the visible light, as addressed above for green light. In addition, the target wavelength need not be 450 nanometers, but in some cases can be 435 nm (e.g., with a range of 430-440 nm), 440 nm (e.g., with a range of 435-445 nm), 445 nm (e.g., with a range of 440-450 nm), 455 nm (e.g., with a range of 450-460 nm), 460 nm (e.g., with a range of 455-465 nm), or 465 nm (e.g., with a range of 460-465 nm).

Other specified wavelengths can be used in other implementations. For example, the UV fluorescing substance(s) in the single ink can be ones that emit yellow light or white light (i.e., emitting light across the visible light spectrum). In any case, a camera 350 is designed and positioned to capture the light emitted by fluorescence of the ink under the UV illumination from the UV light source 340, and a computer 360 (i.e., like computer 150 with machine vision program 156) performs machine vision processing (e.g., optical character recognition (OCR) and/or barcode processing) on the images captured by the camera 350 to identify the product codes (e.g., QR code 320) in the captured images, and then compare these captured codes against what is expected for the products, so as to verify the codes and/or the products.

In order to further facilitate the machine vision processing by the computer 360, the camera 350 can be designed or setup with the specified wavelength in mind. For example, the system 300 can include a wavelength pass filter 355 located between the camera 350 and the product codes. The wavelength pass filter 355 allows light at the specified visible light wavelength to pass through to the camera 355, and blocks light of at least one other visible light wavelength from reaching the camera 355. This can assist in increasing the contrast between the light coming from the ink of the product code 320 and the light coming from the background surface material 325 of the product 310A.

In addition, to even further enhance the contrast, the verification point for the product can be located within a partial or complete enclosure 370 that reduces ambient visible light at the verification point, or the verification point can be placed in a location where all ambient visible light is blocked, and the UV light source 340 is the only light source illuminating the product codes. In typical implementations though, such additional steps are not needed since the fluorescence itself (and potentially the use of the filter 355) is sufficient to create increased contrast for machine vision processing under typical ambient visible lighting conditions.

Figure 4:
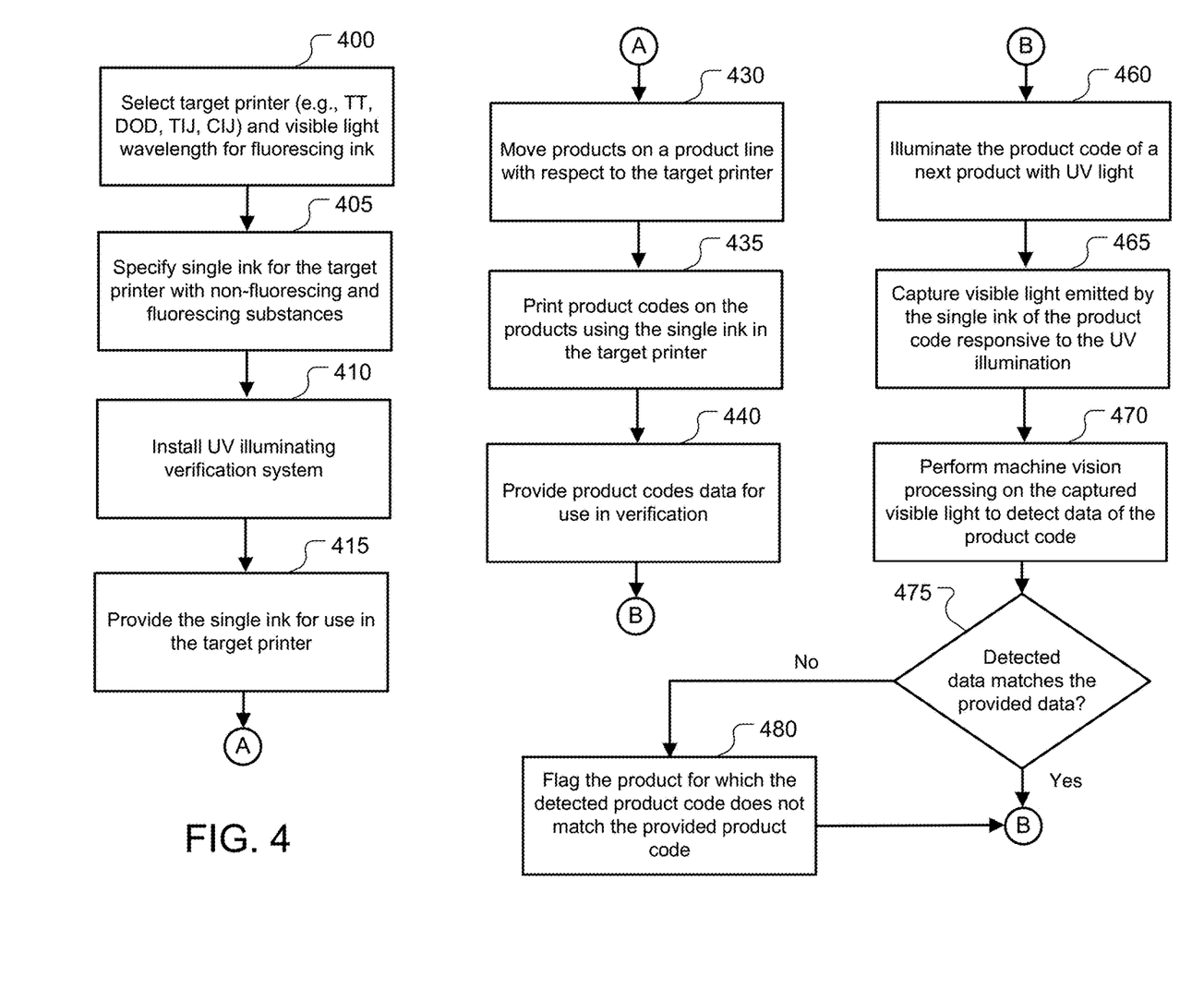
FIG. 4 is a flowchart showing an example of a process of printing and verifying UV fluorescing product codes.

FIG. 4 is a flowchart showing an example of a process of printing and verifying UV fluorescing product codes. The process of FIG. 4 represents three general categories of activities: system design/configuration, product codes printing, and product codes verification. As will be appreciated, these three categories of activities need not be performed by the same party or in proximity to each other. For example, as noted above, the product codes verification process can be entirely separate from the product codes printing process.

A target printer (e.g., TT, DOD, TIJ, CIJ) and a visible light wavelength for fluorescing ink are selected at 400. The particular printer technology to use can be governed by the products to be marked and the needs of the product manufacturer or distributor. In addition, the target visible light wavelength selected for the fluorescence under UV light can also be governed by the products to be marked and the needs of the product manufacturer or distributor. For example, a green versus a blue wavelength can be selected based on the likely product packaging colors, the costs associated with the ink and system components, the robustness of the machine vision system, or a combination of the foregoing.

A single ink for the target printer is specified at 405 with non-fluorescing and UV fluorescing substances. This can involve balancing a ratio, a concentration, or both, of the non-fluorescing substance and the UV fluorescing substance in the single ink so as to ensure both readability by humans under ambient visible lighting conditions and readability by the machine vision processing under the UV illumination. For example, the ratio and the concentration of the non-fluorescing substance and the UV fluorescing substance in the single ink can be selected to generate sufficient visible light responsive to the UV illumination, i.e., enough light from fluorescence to provide a contrast ratio with respect to the product background material that enables the machine vision processing system to accurately identify the product codes from images captured by a camera having a short exposure time (an exposure time less than or equal to 150, 120, or 100 milliseconds).

The UV illuminating verification system is installed at 410. This can involve positioning the UV light source and the camera at the verification point and connecting these components with one or more computers programmed to control the UV light source and the camera to acquire the images with fluorescing product codes, and process the images to detect the data of the product codes. In addition, the single ink is provided at 415 for use in the target printer. This can involve manufacturing and selling the single ink directly, or contracting out the manufacturing of the single ink, and in some cases, and the ink is provided in an appropriate format for the target printer (e.g., on a ribbon for a TT printer).

The process then moves to the product codes printing. Products are moved (e.g., by a conveyor belt 105 or other product movement mechanism) at 430 on a product line (e.g., a product packaging line) with respect to the target printer. Product codes are printed on the products at 435 using the single ink in the target printer (e.g., printer 135). Further, product codes data are provided 440 for use in verification. In some implementations, this involves sending the product codes data to both the printer and the machine vision verification system (e.g., computer 150 with machine vision program 156) at the same time (e.g., communicated concurrently in an integrated product packaging and product code verification system). In other implementations, this involves communicating the product codes data to a third party (e.g., over a network in coordination with a purchase of products to be delivered).

At the verification point, each product in turn has its product code verified. The product code of a next product is illuminated at 460 with UV light (e.g., by UV light source 140, 340). In some implementations, this includes causing the UV fluorescing substance to fluoresce at a specified visible light wavelength corresponding to a wavelength pass filter associated with the camera. On a product line, this UV illumination can be triggered by a sensor that detects the product having been moved into position for verification. In other implementations, the UV light source is triggered by the known timing of the product line, or the UV light is always on during the verification process.

Visible light emitted by the single ink of the product code, responsive to the UV illumination, is captured at 465 (e.g., by camera 145, 350). On a product line, this image capture of the product can be triggered by a sensor that detects the product having been moved into position for verification. In other implementations, the camera is triggered by the known timing of the product line, or by an operator of the verification system.

Machine vision processing is performed at 470 (e.g., by computer 150 with machine vision program 156) on the captured visible light to detect data of the product code. At 475, a check is made as to whether the detected data matches the provided data for the product code. If the data does not match, the product is flagged at 480 for exception handling (e.g., alerting a system operator or triggering a redirection of the unverified product out of the product line for further analysis and/or disposal) before the next product is illuminated for verification.

Note that the focus of this patent application is the use of UV illumination to increase the observed contrast for a visible ink forming the product codes (i.e., the product code ink is visible under normal lighting conditions, without any UV illumination), but the systems and techniques described herein can also be used with other product verification techniques, including covert techniques that are not readily apparent to the end consumer or the general public. For additional details regarding systems and techniques for marking and verifying specific information on products, see U.S. Pat. No. 7,577,596, issued on 18 Aug. 2009, and entitled, "Marking an item with an expiration date", U.S. Pat. No. 7,460,921, issued on 2 Dec. 2008, and entitled, "Dynamic marking system", and U.S. Pat. No. 7,322,520, issued 29 Jan. 2008, and entitled, "Authentication of merchandise units", all three of which are hereby incorporated by reference.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers, and the term "computer readable medium" indicates a tangible (non-transitory) medium on which instructions can be encoded and read by a data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A system comprising:
   a product line configured to move products through a facility;
   a printer arranged in proximity to at least a portion of the product line, the printer configured to mark the products moved through the facility on the product line with product codes using a single ink comprising a combination of a non-fluorescing substance and an ultraviolet (UV) fluorescing substance, wherein a ratio and a concentration of the non-fluorescing substance and the UV fluorescing substance in the single ink are selected to balance readability by humans under ambient visible lighting conditions and readability by machine vision processing under UV illumination;
   a UV light source configured and arranged to illuminate the product codes printed on the products with UV light, wherein the UV light source is positioned relative to the product line to illuminate the product codes printed on the products;

a camera configured and arranged to capture visible light emitted by the single ink of the product codes responsive to the illumination with the UV light; and a controller coupled with the camera and configured to perform the machine vision processing on the captured visible light to identify and confirm the product codes printed on the products using an increased contrast ratio between the product codes and a background of the products resulting from fluorescing of the single ink.

2. The system of claim 1, wherein the ratio and the concentration of the non-fluorescing substance and the UV fluorescing substance in the single ink are selected to generate sufficient visible light responsive to the UV illumination for the machine vision processing after capture by the camera with an exposure time of 150 millisecond or less, 120 millisecond or less, or 100 millisecond or less.

3. The system of claim 2, wherein the non-fluorescing substance comprises components of a black ink, and the single ink is black or dark grey under ambient visible lighting conditions.

4. The system of claim 2, wherein the UV fluorescing substance is selected to fluoresce at a specified visible light wavelength, and the system comprises a wavelength pass filter located between the camera and the product codes, wherein the wavelength pass filter (i) allows light at the specified visible light wavelength to pass through and (ii) blocks light of at least one other visible light wavelength.

5. The system of claim 4, wherein the specified visible light wavelength is approximately 510 nanometers or approximately 450 nanometers.

6. The system of claim 4, wherein the UV light source emits light having a wavelength of 365 nanometers.

7. The system of claim 1, wherein the product codes comprise date codes.

8. The system of claim 1, wherein the printer comprises thermal transfer (TT) printer technology, drop on demand (DOD) printer technology, thermal inkjet (TIJ) printer technology, or continuous ink jet (CIJ) printer technology.

9. The system of claim 1, wherein the facility is a product manufacturing facility and the product line is a product packaging system.

10. A method comprising:
moving products on a product line;
printing product codes on the products on the product line using a single ink comprising a combination of a non-fluorescing substance and an ultraviolet (UV) fluorescing substance, wherein printing the product codes comprises using the single ink, which has a ratio and a concentration of the non-fluorescing substance and the UV fluorescing substance that has been selected to balance readability by humans under ambient visible lighting conditions and readability by machine vision processing under UV illumination;

illuminating the product codes printed on the products with UV light on the product line;

capturing visible light emitted by the single ink of the product codes responsive to the UV light illumination of the product codes; and performing the machine vision processing on the captured visible light to identify and confirm the product codes printed on the products using an increased contrast ratio between the product codes and a background of the products resulting from fluorescing of the single ink.

11. The method of claim 10, wherein capturing the visible light comprises using a camera with an exposure time of 150 millisecond or less, 120 millisecond or less, or 100 millisecond or less, and the ratio and the concentration of the non-fluorescing substance and the UV fluorescing substance in the single ink have been selected to generate sufficient visible light responsive to the illuminating for the machine vision processing after capture by the camera with the exposure time.

12. The method of claim 11, wherein the illuminating comprises causing the UV fluorescing substance to fluoresce at a specified visible light wavelength corresponding to a wavelength pass filter that (i) allows light at the specified visible light wavelength to pass through and (ii) blocks light of at least one other visible light wavelength.

13. The method of claim 12, wherein the illuminating comprises emitting light having a wavelength of 365 nanometers.

14. The method of claim 10, wherein printing the product codes comprises printing date codes.

15. The method of claim 10, wherein printing the product codes comprises using a thermal transfer (TT) printer.

16. The method of claim 10, wherein printing the product codes comprises using a drop on demand (DOD) printer.

17. The method of claim 10, wherein printing the product codes comprises using a thermal inkjet (TIJ) printer.

18. The method of claim 10, wherein printing the product codes comprises using a continuous ink jet (CIJ) printer.

* * * * *